Dec. 27, 1938.  C. B. SCHNEIBLE  2,141,829
COLUMN
Filed Oct. 30, 1935  2 Sheets-Sheet 1

Inventor:
Claude B. Schneible.
By Dynenforth, Lee, Chritton & Wiles
Attys.

Dec. 27, 1938. C. B. SCHNEIBLE 2,141,829
COLUMN
Filed Oct. 30, 1935 2 Sheets-Sheet 2

Inventor:
Claude B. Schneible.
By Dyrenforth, Lee, Chritton & Wiles.
Attys.

Patented Dec. 27, 1938

2,141,829

UNITED STATES PATENT OFFICE 2,141,829

COLUMN

Claude B. Schneible, Chicago, Ill.

Application October 30, 1935, Serial No. 47,488

6 Claims. (Cl. 261—18)

This invention relates to improvement in columns, such as dust-separating columns, distilling columns, dephlegmating towers, scrubbing towers, absorption towers and similar towers.

An object of the invention is to provide a column in which two streams of liquid are employed, one stream being used in the lower portion of the column to carry away the heavier particles of material while the other stream is employed in the upper portion of the column to carry away the remaining lighter particles of material. A further object is to pass vapor, air or other gases upwardly through a column and in contact with different liquids, the liquids being kept separate and at least the liquid employed in the upper portion of the column recycled. A further object is to provide a column in which the entering air or the like is given a whirling motion so as to throw out particles of material by centrifugal force, a stream of water or other suitable liquid being directed about the lower walls of the column to carry away such heavier particles while a stream of oil or other suitable material is recycled in the upper portion of the column to contact and remove the lighter particles carried by the ascending air stream. Other specific objects and advantages will appear as the specification proceeds.

The invention is illustrated, in a preferred embodiment, by the accompanying drawings, in which—

Figure 1:
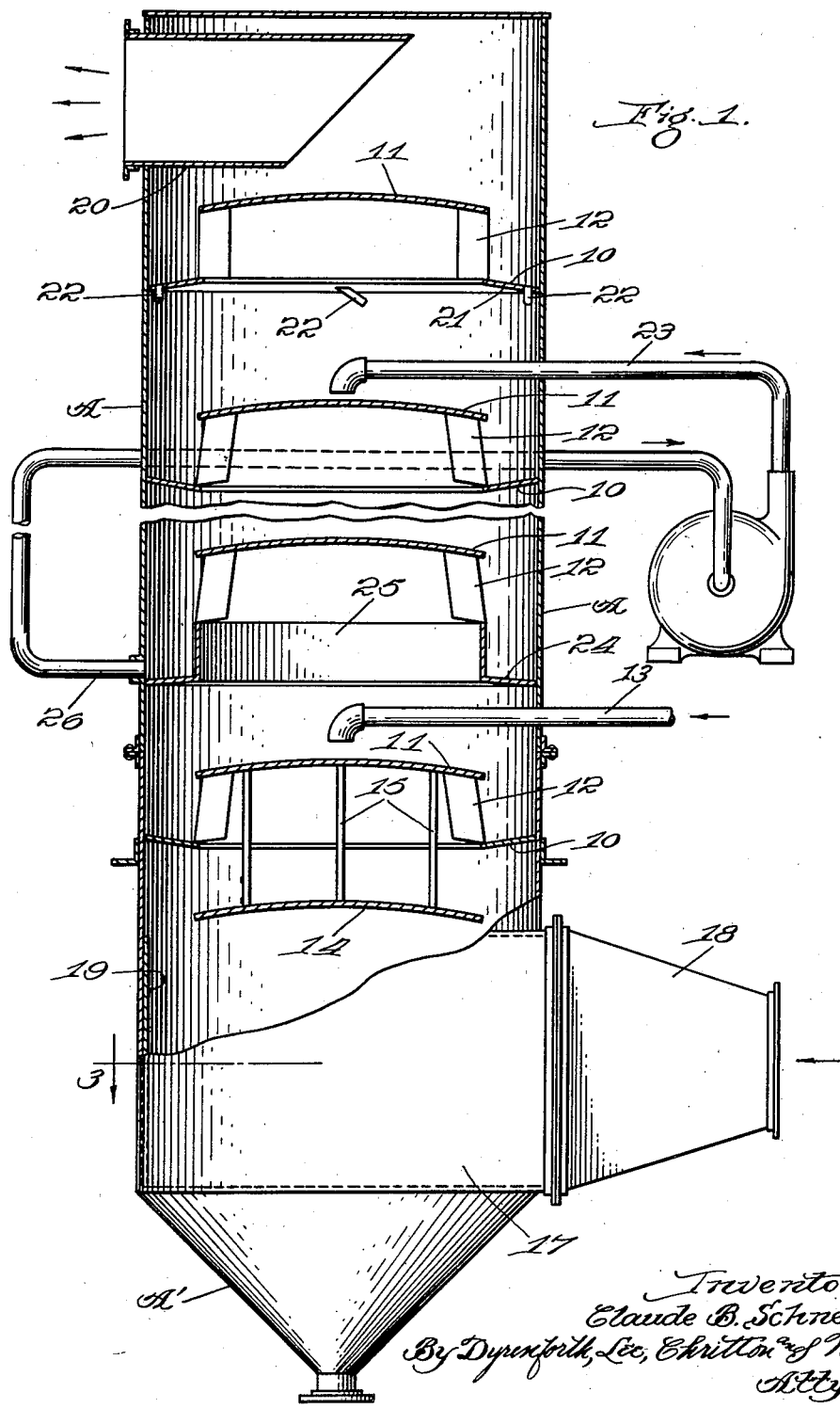
Figure 2:
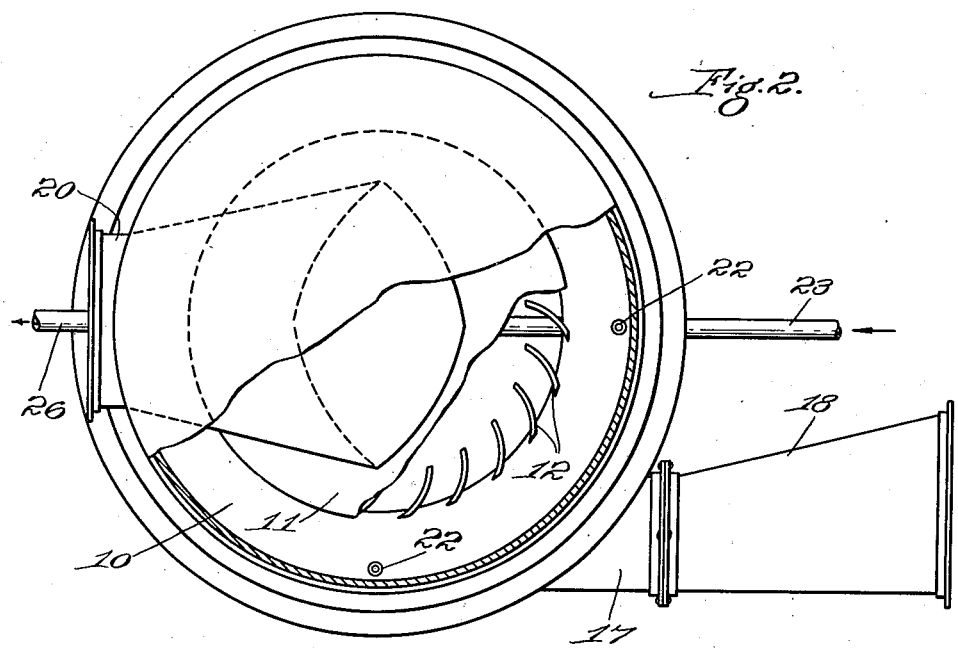
Figure 3:
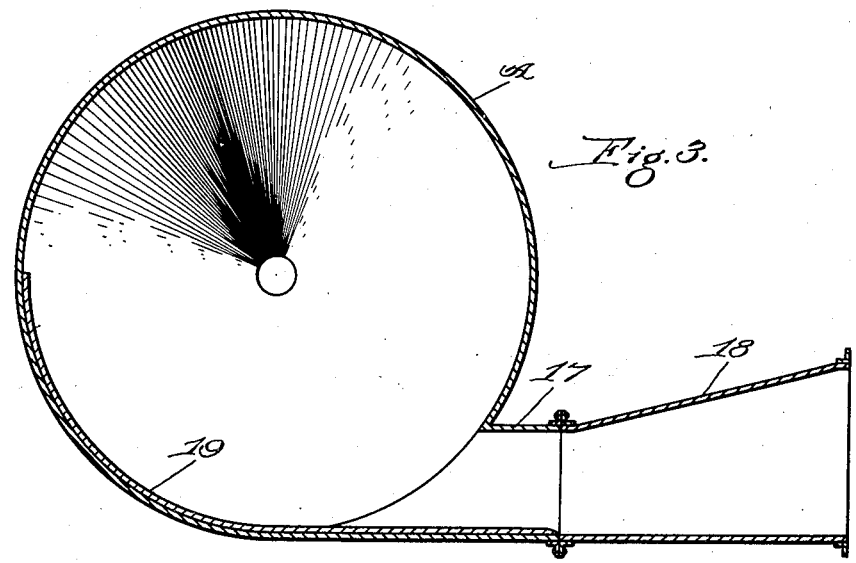

Figure 1 is a vertical sectional view of a column embodying my invention; Fig. 2, a top plan view, a portion of the top wall being broken away; and Fig. 3, a transverse sectional view, the section being taken as indicated at line 3 of Fig. 1.

In the illustration given, the casing A is provided on its interior preferably with a series of baffles of the plate and ring type. 10 designates the baffle ring and 11 the plate. Between the plates and rings are secured vanes 12 which impart a whirling or circular motion to the air, vapor, or other gaseous material passing upwardly through the casing. The baffle plates and vanes are described in greater detail in my Patents Nos. 1,783,813 and 1,790,596.

In the lower portion of the column is a liquid inlet pipe 13, the end of the pipe being turned downwardly at about the center of the column. Below the lowermost baffle is supported a curved deflector 14. The deflector 14 is preferably suspended by rods 15 which are welded at their upper ends to the lowermost plate 11.

Below deflector 14, the casing A provides a tangential rectangular air or vapor inlet 17 to which is connected an inlet pipe fitting 18. Adjacent the inner side of pipe 18 and extending about half way about the casing A is a wear ring 19 which is designed to protect the wall of the casing from abrasion caused by foreign particles carried in the incoming air or vapor.

The purified air, vapor or gas is drawn off at the top of the column through the horizontal outlet pipe 20 which has an inclined opening in about the center of the column. With this construction, the purified air is drawn from the central portion of the rotating annulus of air, the heavier portions of the annulus being carried by centrifugal force near the walls of the column.

The casing A is provided below the inlet 17 with a funnel-shaped discharge portion A'. Any suitable outlet connection may be connected with the lower flanged end of casing portion A'.

The topmost baffle ring 10 is preferably downwardly inclined at 21 to provide a trough for receiving entrained liquid thrown out of the air above the trough. Inclined pipes 22 extend downwardly from the trough and at an angle inclined in the direction of rotation of the air. The rotating air passing the pipes 21 tends to suck liquid therethrough from the trough.

Below the topmost baffle ring 10 there is a second liquid inlet pipe 23 which may be employed for introducing a suitable oil or other liquid which is tenacious and effective in removing dust particles, etc., from the ascending stream of air or the like. Any desired number of baffles may be disposed below the discharge end of pipe 23.

Just above pipe 13, I provide a baffle ring 24 which is inclined downwardly toward the column wall A to provide a trough adjacent the wall. Integrally formed with the inner end of ring 24 is a vertical collar 25. The vanes 12 rise upon the top of collar 25 and the top plate 11 is carried by the vanes 12. An outlet pipe 26 for the oil or other suitable liquid employed above baffle ring 24 communicates with the trough formed by the baffle plate 24, collar 24 and column A. The pipe 26 preferably communicates with a pump (not shown) by which the oil is again forced into inlet pipe 23.

Assuming that the column is to be used for the purpose of removing dust particles from air, the dust-laden air is passed through pipe 18 into the tangential inlet 17. The entering air is thus given a circular motion, and as it is drawn upwardly through the succeeding baffles, the vanes 12 maintain the circular motion of the air. The whirling mass of air is contacted in its upward movement by a downwardly flowing stream of liquid from the pipe 13. The stream of liquid is given a whirling motion by contact with the air and the liquid particles are brought into contact with the solid dust particles carried by the air, thus washing the dust particles downwardly through the column. Near the bottom portion of the column, the deflector 14 directs the whirling liquid stream against the walls of the column, thus washing the walls free of dust. The rotating liquid sheet also forms a blanket to protect the walls from the dust particles which are thrown out by centrifugal force against the walls. The sheet of liquid further serves the purpose of collecting the heavy dust particles which are thrown out by centrifugal force in the lower portion of the column, carrying them downwardly through the funnel portion A'. The funnel portion A' is also designed as to enable the rotating sheet of liquid to move downwardly without interference, while thoroughly cleaning the inner surface of the column from dust, mud, etc. The rotating air distributes the liquid evenly and uniformly over the bottom portion of the column.

By providing a rotating liquid sheet in the bottom of the column adjacent the entrance of the dust-laden air, a very substantial amount of the dust is removed at once as it is thrown out by centrifugal force, thus saving the upper portion of the column from contact with such abrasive material. If desired a cheap liquid such as water may be introduced through pipe 13 and by this means most of the foreign particles can be removed at the very outset with very slight cost thus enabling one to use a more expensive and at the same time a more efficient liquid in the upper part of the column to remove the finer particles of dust.

Through pipe 23 the oil or other suitable liquid is introduced and successively brought into contact with the ascending air stream by the baffle device placed below pipe 23. The fine dust is effectively removed and carried downwardly into the trough formed by ring 24, collar 25 and the column wall A. From the trough, pipe 26 leads the oil or the like to a pump by which it may be returned to inlet pipe 23. By using the oil or other suitable liquid in the upper portion of the chamber as described and after the greater portion of the dust particles have been removed, I am able to recycle the oil for a very substantial period before it becomes too contaminated to prevent reusing.

Any entrained oil drops which may be carried by the air into the upper portion of the column are thrown out by the rotating annulus of air and fall into the trough formed by the uppermost ring 10. The inclined pipes 22 are arranged at an angle inclined in the direction of rotation of the air so that the rotating air tends to suck liquid therethrough from the trough. In this manner, the oil is retained within the oil chamber of the column and is consistently reutilized for contacting the rising current of air.

Although the present invention has been described in connection with the details of a specific embodiment thereof, it is not intended that such details shall be regarded as limitations upon the scope of the invention except insofar as included in the accompanying claims, and in the accompanying claims where the words "gas", "vapor", "air", etc., are used, it will be understood that such terms are used interchangeably and in their broad sense to include all vapors, gases and the like.

I claim:

1. In a dust collector column, a tangential air inlet in the base of said column, a deflector disk above said inlet, means for supplying liquid upon said deflector disk to form a rotating sheet of liquid of unified mass covering the entire inside surface of the lower portion of the column, and means for recycling a second stream of liquid through the upper portion of said column in contact with the air in the upper portion of the column.

2. In a dust collector column a tangential air inlet in the base of said column, means for forming a rotating sheet of liquid above the inner surface of the lower portion of the column, means for contacting the rising stream of air with a descending stream of oil, and means for collecting and recycling said oil stream.

3. A method for the purposes set forth, comprising: contacting a stream of dust-laden air with water while said air stream is in the form of an annulus of air in rapid circular motion and while maintaining said water in a sheet about the periphery of said annulus of air; contacting the partly cleansed air stream with oil; and recycling said oil for again contacting the stream of partly cleansed air.

4. In a dust collector column, an air inlet at the base of said column, means for contacting a stream of air with a liquid in the lower portion of the column, means for contacting said stream of air with a descending stream of oil, and means for collecting and recycling said oil stream.

5. A method for the purposes set forth, comprising: contacting a stream of dust-laden air with water while said air stream is in the form of a cylindrical body and while maintaining said water in a sheet about the periphery of said body of air; contacting the partly cleansed air stream with oil; and recycling said oil for again contacting the stream of partly cleansed air.

6. A method for the purposes set forth comprising: introducing a stream of dust-laden air into the lower portion of a column, passing a stream of water through said portion of the column and in contact with said air to partly cleanse said air, passing a stream of oil into said column and in contact with said partly cleansed air, and recycling said oil for again contacting said air stream.

CLAUDE B. SCHNEIBLE.